(12) United States Patent  (10) Patent No.: US 9,272,368 B2
Fuhrmann                    (45) Date of Patent:    Mar. 1, 2016

(54) METHOD OF JOINING TWO COMPONENTS USING A WELDING PROCESS

(71) Applicant: Emerson Climate Technologies GmbH, Waiblingen (DE)

(72) Inventor: Christian Fuhrmann, Rommerskirchen (DE)

(73) Assignee: Emerson Climate Technologies GmbH (DE)

( * ) Notice: Subject to any disclaimer, the term of this patent is extended or adjusted under 35 U.S.C. 154(b) by 432 days.

(21) Appl. No.: 13/945,693

(22) Filed: Jul. 18, 2013

(65) Prior Publication Data

US 2014/0021176 A1    Jan. 23, 2014

(30) Foreign Application Priority Data

Jul. 18, 2012    (EP) ..................... 12176930

(51) Int. Cl.
    B23K 26/211    (2014.01)
    B23K 26/323    (2014.01)
    B23K 26/20     (2014.01)
    B23K 26/32     (2014.01)

(52) U.S. Cl.
    CPC ............ B23K 26/203 (2013.01); B23K 26/211 (2015.10); B23K 26/282 (2015.10); B23K 26/32 (2013.01); B23K 26/322 (2013.01); B23K 26/323 (2015.10); B23K 2201/06 (2013.01); B23K 2203/08 (2013.01); B23K 2203/12 (2013.01)

(58) Field of Classification Search
    CPC ... B23K 26/211; B23K 26/322; B23K 26/323
    USPC ................ 219/121.64; 148/528; 228/262.6
    See application file for complete search history.

(56) References Cited

U.S. PATENT DOCUMENTS

| | | | |
|---|---|---|---|
| 1,988,422 A | | 1/1935 | Miller |
| 3,188,203 A | * | 6/1965 | Peaslee ................ B23K 35/304 420/453 |
| 4,187,408 A | | 2/1980 | Heile |
| 5,276,298 A | | 1/1994 | Jones et al. |
| 6,322,652 B1 | | 11/2001 | Paulson et al. |
| 6,479,168 B2 | | 11/2002 | Mazumder et al. |
| 7,820,939 B2 | | 10/2010 | Mazumder et al. |
| 7,858,900 B2 | | 12/2010 | Orye et al. |
| 2009/0001060 A1 | | 1/2009 | Orye et al. |
| 2011/0192824 A1 | | 8/2011 | Vestergaard et al. |

FOREIGN PATENT DOCUMENTS

| | | |
|---|---|---|
| CN | 85107767 A | 4/1987 |
| EP | 1035259 A1 | 9/2000 |
| GB | 797847 | 7/1958 |
| GB | 1233311 | 5/1971 |

(Continued)

*Primary Examiner* — Samuel M Heinrich
(74) *Attorney, Agent, or Firm* — Leech Tishman Fuscaldo & LAMPL, LLP; Kenneth D'Alessandro, Esq.

(57) ABSTRACT

The present disclosure provides an improved welding process for joining two components of which at least one comprises a brass alloy. In one exemplary embodiment, an intermediate part that includes a metal material different from a brass alloy may be arranged between the components such that it is in contact with the components in marginal regions. The intermediate part may then be heated during the welding process such that it enters into a connection having material continuity with the components in the marginal regions.

12 Claims, 2 Drawing Sheets

(56) References Cited

FOREIGN PATENT DOCUMENTS

| | | | |
|---|---|---|---|
| JP | 60152390 A | 8/1985 | |
| JP | 8218137 A | 8/1996 | |
| JP | 11314051 A | 11/1999 | |
| JP | 2000135570 A | 5/2000 | |
| JP | 2002336983 A | * | 11/2002 |
| JP | 2008183612 A | 8/2008 | |
| WO | 2005124929 A1 | 12/2005 | |

* cited by examiner

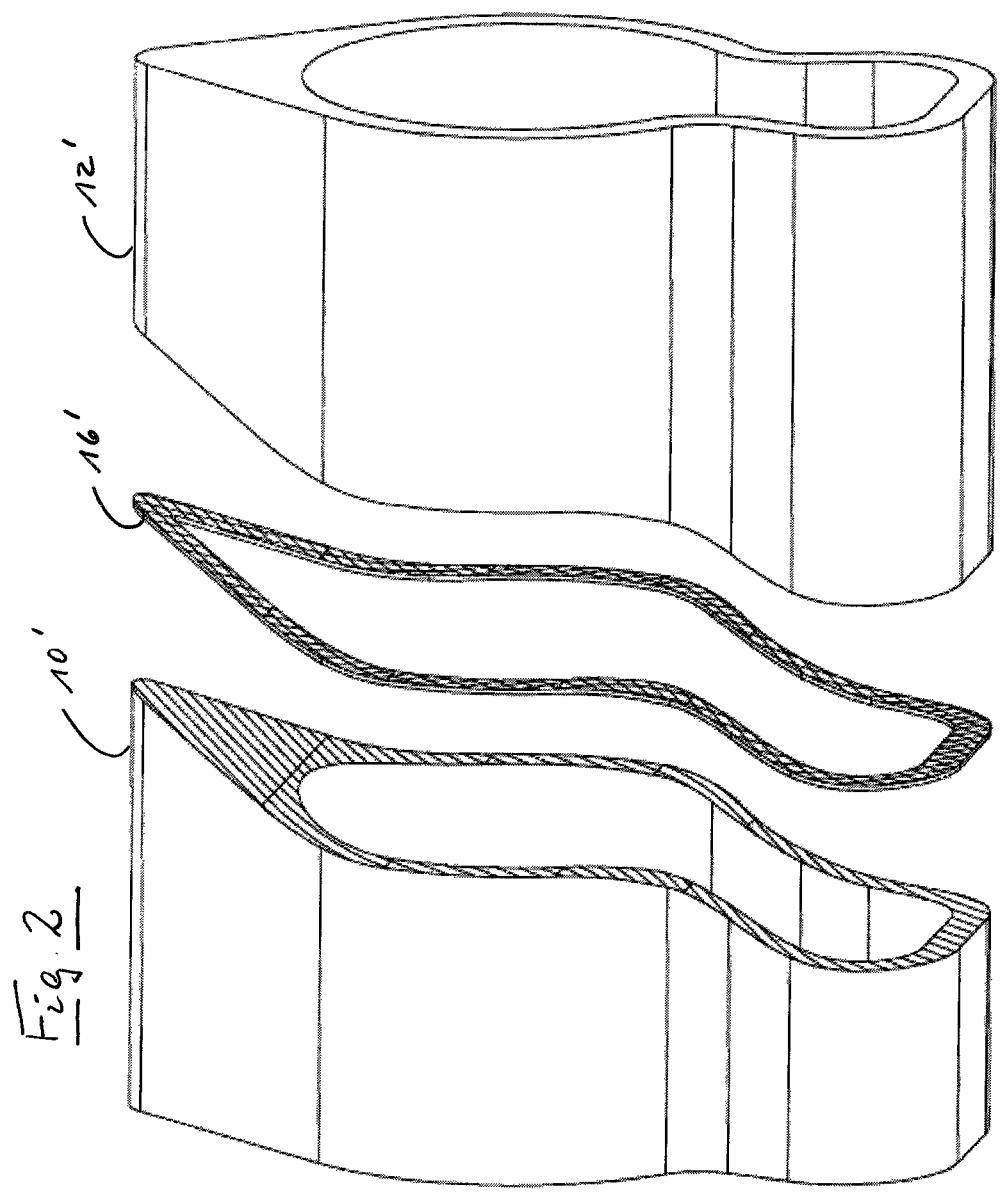

METHOD OF JOINING TWO COMPONENTS USING A WELDING PROCESS

CROSS-REFERENCE TO RELATED APPLICATION

This application claims priority to European Patent Application No. 12 176 930.1, filed on Jul. 18, 2012, the entire disclosure of which is incorporated by reference herein.

BACKGROUND

The present disclosure relates to welding. More particularly, it relates to a method of joining two components using a welding process wherein at least one of the components comprises a brass alloy.

The joining of components using welding is generally known. However, the welding of brass proves problematic due to the zinc that is contained therein, which vaporizes during the welding process. Because explosive zinc vaporizations continuously occur throughout the process, high-quality welds of brass components can in particular only be realized with great difficulty using conventional arc welding processes. The same applies to the laser welding of brass. Namely, with a focused laser beam, a large portion of the zinc vaporizes in the melt so that a deep cut arises in the weld. If work is in contrast carried out using a defocused laser beam, the weld widens and the explosive zinc vaporizations are reduced; but at the same time, the welding depth is also reduced to only a few tenths of a millimeter. There is yet another difficulty in that that the laser radiation is only slightly absorbed by brass under certain circumstances. As a result, welding brass can require a considerably higher laser performance than is required when, for example, welding steel. Given these shortcomings, there is a need in the art for an improved method of welding brass.

SUMMARY

The present disclosure provides an improved welding process for joining two components of which at least one comprises a brass alloy. In one exemplary embodiment, an intermediate part (16) that includes a metal material different from a brass alloy may be arranged between the components (10, 12) such that it is in contact with the components (10, 12) in marginal regions (18, 20). The intermediate part may then be heated during the welding process such that it enters into a connection having material continuity with the components (10, 12) in the marginal regions (18, 20).

The present disclosure also provides an apparatus for joining two components of which at least one comprises a brass alloy using a welding process. In one exemplary embodiment, an apparatus may include a means for arranging an intermediate part (16) that includes a metal material different from a brass alloy between the components (10, 12) such that the intermediate part (16) is in contact with the components (10, 12) in marginal regions (18, 20). The apparatus may further include a means for heating the intermediate part (16) such that it enters into a connection having material continuity with the components (10, 12) in the marginal regions (18, 20).

BRIEF DESCRIPTION OF THE DRAWINGS

FIG. 2 is a perspective exploded view of two components to be joined using laser welding as well as of an intermediate part serving as a joining agent.

DETAILED DESCRIPTION

Figure 1B:
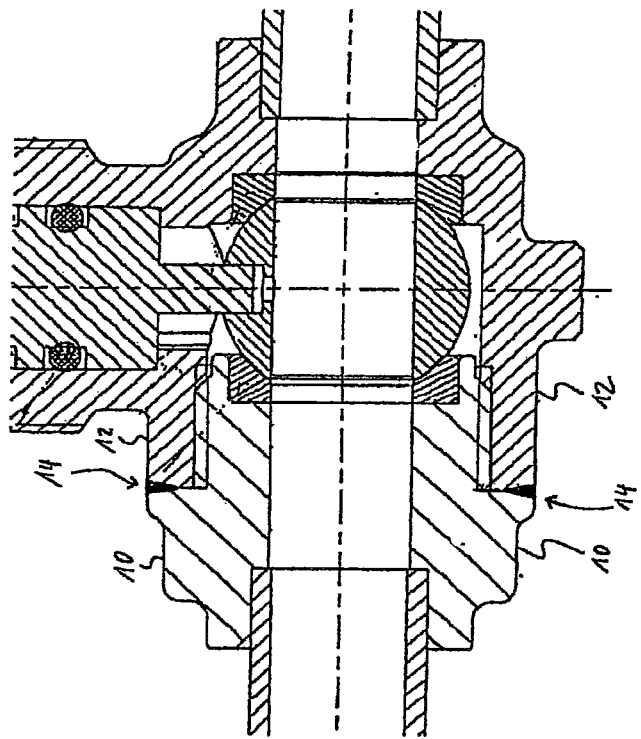
FIG. 1b is a sectional view of two components to be joined using laser welding after the end of the welding process.

Those of ordinary skill in the art will realize that the following description of the present invention is illustrative only and not in any way limiting. Other embodiments of the invention will readily suggest themselves to such skilled persons.

In a first embodiment, a method of joining two components using a welding process wherein at least one of the components comprises a brass alloy may include arranging an intermediate part that comprises a metal material different from a brass alloy between the components to be joined such that it is in contact with the components in marginal regions. The method may further include heating the metal material during the welding process such that it enters into a connection having material continuity with the components in the marginal regions.

The intermediate part not formed of brass may serve as a joining medium or an adhesion promoter for the components to be connected. The use of the intermediate parts makes it possible also to weld components containing brass reliably and in particular in a gastight manner, for example using a laser welding process. The method in may also be advantageous because the laser welding process has advantages with respect to conventional arc welding processes due to its lower heat input. Among other benefits, the lower heat input reduces the risk that inner component parts will be damages damaged when joining valve components or other components.

In one embodiment, the intermediate part may include a bronze alloy. Such an intermediate part may be characterized by a particularly effective energy coupling during the welding process so that work can be carried out at smaller powers during the welding process, and in particular during a laser welding process. During such the process, a minimal vaporization of zinc may take place. At the same time, the process may create a weld connection that can be several millimeters deep. In this respect, the bronze may blend with the brass in the marginal regions to form a homogeneous inter-metallic phase. In doing so, the process achieves a particularly mechanically stable and gastight connection of the components to be joined.

In several embodiments, the intermediate part may be formed from a material including at least one of the following alloys: CuSn4, CuSn6, CuSn8, CuSn10 and CuSn12. In this respect, CUSN12 has proved particularly advantageous in the laser welding of brass components.

In embodiments applied to components that are designed as rotationally symmetrical in the region of the join site, the intermediate part may be configured in the manner of a ring or of a punched disk. In contrast, in embodiments wherein plate-shaped components or metal sheets are to be welded, as is the case in butt welding for example, the intermediate part may be configured as strip-shaped. In both cases, the thickness of the intermediate part may lie in the range from 0.1 mm to 2 mm. The use of thinner bronze films is also generally conceivable depending on the application.

To take account of material vaporization which may occur under certain circumstances during a welding process, the intermediate part may be dimensioned and/or positioned between the components so that it projects beyond the components before the welding process. In this manner, a join site at least approximately free of seam under-arching can be realized between the joined components.

As already indicated, the exemplary methods disclosed herein may be particularly suitable for joining two components that are both manufactured from brass, such as valve components. Such methods may also, however, generally be suitable for joining two components in situations wherein only one comprises a brass alloy while the other comprises another metal material such as steel or copper.

In accordance with an embodiment, the components may be configured as rotationally symmetrical, for example tubular, at least in the region of the join site. It is, however, alternatively also possible to weld two metal sheets to one another by butt welding. Generally, three-dimensional components of any desired configuration may be welded to one another using the method disclosed herein.

In another embodiment, the welding process may be advantageously carried out using a laser beam generated by a laser. The energy input during the welding process may be topically restricted to the intermediate part and an unwanted vaporization of zinc from the brass component may be avoided or at least reduced to a minimum. The laser beam may advantageously only be directed to an exposed region of the intermediate part. In other words, the laser beam may enter directly into the intermediate part without previously passing through one of the components to be joined.

In some embodiments, to further optimize the energy input into the intermediate part and thus the melting of the intermediate part, the laser beam may be split into two part beams using a dual-focus optics. Alternatively, in other embodiments, the welding process may also be carried out using a defocused laser beam. In still further embodiments, the welding process may be carried out using an oscillating laser beam.

The present disclosure further provides an apparatus for joining two components using a welding process. In some embodiments, at least one of the components may include a brass alloy. The apparatus may include a means for arranging an intermediate part between the components such that the intermediate part is in contact with the components in marginal regions. The intermediate part may include a metal material different from a brass alloy. The apparatus may further include a means for heating the intermediate part such that it enters into a connection having material continuity with the components in the marginal regions. Such an apparatus can assist a user with achieving the above-described advantages in the field of welding. In some embodiments, the apparatus may be suitable for an automated carrying out of method disclosed herein.

Figure 1A:
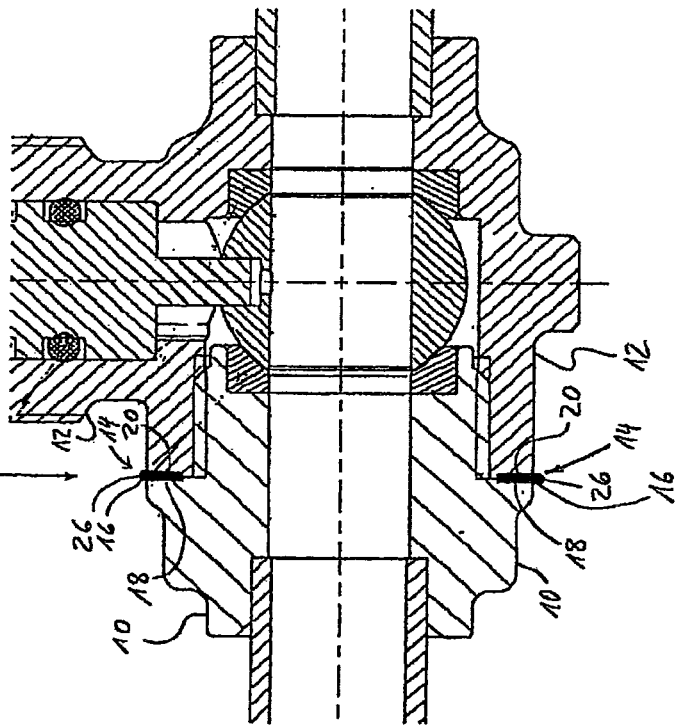
FIG. 1a is a sectional view of two components to be joined using laser welding at the start of the welding process.

Referring first to FIG. 1, a sectional view of two components to be joined using an exemplary laser welding process in shown both at the start of the welding process (as shown in FIG. 1a) and after the end of the welding process (as shown in FIG. 1b). Namely, two components 10, 12 are shown which are each formed from a brass alloy and which should be joined using laser welding. The components 10, 12 can, for example, be components of a valve, of a faucet, of a measuring instrument or sections of pipelines that are rotationally symmetrical in design at least in the region of the join site 14.

In the region of the join site 14, an intermediate part in the form of a bronze ring 16 is arranged between the components 10, 12 such that a first marginal region 18 of the bronze ring 16 is in contact with the one component 10 and an oppositely disposed second marginal region 20 of the bronze ring 16 is in contact with the other component 12.

The insertion of the bronze ring 16 between the components 10, 12 can take place in an automated manner, for example, using a suitable gripping tool of an apparatus in which the components 10, 12 have previously been clamped.

In one embodiment, the thickness of the bronze ring 16 in the present may be approximately 0.5 mm while the depth of the bronze ring 16 may be approximately 2 mm when viewed in the radial direction. In other embodiments, the thickness and depth may be larger or smaller depending on the application.

Although not absolutely required, in some embodiments, the outer diameter of the bronze ring 16 may be a little larger than the outer diameter of the components 10, 12 to be joined in the region of the join sites 14 so that the bronze ring 16 projects slightly beyond the components 10, 12 in the region of the join site 14. Namely, in other embodiments, the outer diameter of the bronze ring 16 can also be just as large as or smaller than the outer diameter of the components 10, 12 to be joined in the region of the join site 14.

A laser beam 24, e.g. a laser beam emitted by an Nd:YAG laser having a wavelength of 1.06 µm, may be directed to the exposed outer side 26 of the bronze ring 16 for welding the components 10, 12. The energy input into the bronze ring 16 may be controlled by a circulating movement of the laser beam 24 relative to the bronze ring 16 so that the bronze ring 16 melts in its marginal regions 18, 20 over at least approximately the whole depth of the bronze ring 16 viewed in the radial direction and combines with the material of the components 10, 12 to form a homogeneous inter-metallic phase. The fact that the laser beam 24 is not directly directed onto the brass components 10, 12, but that rather a focusing of the energy input onto the bronze ring 16 takes place, greatly helps with avoiding unwanted vaporization of zinc from the brass of the components 10, 12.

The result of the improved welding process disclosed herein is a high-quality, and in particular gastight, weld connection of the components 10, 12 that is accompanied by a comparatively small material vaporization (as shown in FIG. 1b).

Whereas the welding of rotationally symmetrical components 10, 12 was described above, it should also be pointed out that any desired three-dimensionally shaped components can generally be welded.

Referring next to FIG. 2, a perspective exploded view of two components and an intermediate part serving as a joining agent to be joined using an exemplary laser welding process is shown. Namely, FIG. 2 shows two components 10', 12', each comprising a brass alloy, in the form of non-rotationally symmetrical hollow sections which can be welded by means of a correspondingly shaped bronze ring 16'. It can in particular also be seen from this embodiment that the bronze ring 16' does not necessarily have to extend in one plane, but the weld can rather also extend three-dimensionally.

Furthermore, plate-shaped components or metal sheets can furthermore naturally also be welded to one another, e.g. by butt welding. In these, the intermediate part would then be designed correspondingly in the form of a bronze strip.

While illustrative embodiments have been disclosed herein, persons ordinarily skilled in the art will realize that other embodiments employing the inventive principles disclosed herein are possible, and such embodiments will readily suggest themselves to such skilled persons. Accordingly, the present invention should only be limited within the spirit of the claims.

What is claimed is:

1. A method of joining two components (10, 12) of which at least one comprises a brass alloy using a laser welding process, in which method an intermediate part (16) which is formed from a material comprising at least one of the following alloys: CuSn4, CuSn6, CuSn8, CuSn10 and CuSn12, is arranged between the components (10, 12) such that it is in contact with the components (10, 12) in marginal regions (18, 20), and is heated during the welding process using a laser beam (24) which is generated by a laser such that it enters into a connection having material continuity with the components (10, 12) in the marginal regions (18, 20).

2. The method in accordance with claim 1, wherein the intermediate part (16) is ring-shaped or in the form of a punched disk.

3. The method in accordance with claim 1, wherein the thickness of the intermediate part (16) lies in the range from 0.1 mm to 2 mm.

4. The method in accordance with claim 1, wherein the components are joined in a region at a join site (14).

5. The method in accordance with claim 4, wherein a maximum outer dimension of the intermediate part (16) is larger than a maximum outer dimension of the components (10, 12) in the region of the join site (14).

6. The method in accordance with claim 1, wherein the intermediate part (16) is dimensioned and/or is positioned between the components (10, 12) such that it projects beyond the components (10, 12) before the welding process.

7. The method in accordance with claim 1, wherein both components (10, 12) comprise a brass alloy.

8. The method in accordance with claim 4, wherein the components (10, 12) are rotationally symmetrical at least in the region of the join site (14).

9. The method in accordance with claim 1, wherein the laser beam (24) is directed to an exposed region (26) of the intermediate part (16).

10. The method in accordance with claim 1, wherein the laser beam (24) is split into two part beams using a dual-focus optics.

11. The method in accordance with claim 1, wherein the welding process is carried out using a defocused laser beam (24).

12. The method in accordance with claim 1, wherein the welding process is carried out using an oscillating laser beam (24).

* * * * *